3,452,437
DENTAL RESTORATIVE MATERIAL
Robert W. H. Chang, St. Paul, Minn., assignor to
Minnesota Mining and Manufacturing Company,
St. Paul, Minn., a corporation of Delaware
No Drawing. Continuation-in-part of application Ser. No.
409,564, Nov. 6, 1964. This application Oct. 12, 1965,
Ser. No. 495,300
Int. Cl. A61k 5/00; C08g 51/04
U.S. Cl. 32—15        7 Claims

ABSTRACT OF THE DISCLOSURE

Dental filling compositions for teeth are provided which assume the color of the tooth structure in which they are placed. These are termed mimetic fillings. The mimetic effect is achieved with inorganic particles having particular geometries in a hardenable organic binder by maintaining the range of refractive indices of the inorganic particles within a certain range above the index of the hardened binder.

---

This application is a continuation-in-part of my copending application S.N. 409,564 filed Nov. 6, 1964, and now abandoned.

This invention relates to filling materials for teeth, and particularly to a readily smoothed filling material having mimetic or self-color-matching properties.

Various materials used in the filling of teeth are described together with test procedures, for example, in Guide to Dental Materials, 2nd ed., 1964, published by the American Dental Association, Chicago, Ill., U.S.A. The older metallic fillings cannot match the color of teeth. Thus, silicate cements and, to a lesser extent, wholly plastic direct filling resins, both of which are tinted by the addition of pigments, are now in general use for the filling of anterior teeth. In order to improve the properties of direct filling resins it has been proposed to add fillers such as powdered fused silica and the like to these polymers, see for example, Patent No. 3,066,112, issued Nov. 27, 1962, however, color-matching by addition of pigments remains necessary and the off-shades of teeth may vary not only during the life of the individual but also over the surface of a single tooth. Furthermore, the tint of the composition before setting is often not exactly what it becomes after setting, or even after aging. Thus, the color-matching of dental fillings by the addition of pigments to the filling material as practiced in the prior art imposes certain basic disadvantages.

This invention provides for the first time an essentially unpigmented restorative material of the direct filling resin type suitable for filling and matching the color of anterior teeth having a wide variety of enamel shades and hues. The hardened fillings of this material assume or mimic the coloration of the tooth enamel around the fillings.

What has been achieved by this invention is an entirely new concept: mimetic color-matching of dental fillings. Fillings prepared in accordance with these teachings not only simulate the tooth enamel closely in texture and general appearance but they also tend to mimic it by assuming the natural colors of the enamel. Mimetic fillings are aesthetically superior to prior known fillings in that these novel fillings take on the hues of their surroundings and are not dependent on pigments to provide color matching.

This invention provides for the first time a method for the restoration of the normal contours of a tooth having a discontinuity in the enamel thereof which comprises adhering to the dentine and enamel defining said discontinuity a spontaneously hardenable composition comprising an essentially unpigmented combination of substantially colorless solid particles and substantially colorless binder, which combination has optical properties such that upon hardening it assumes the coloration of the surrounding tooth substance.

The versatility of these compositions is such that in the vast majority of clinical cases they fully match the color of the surrounding tooth in their substantially unpigmented state. Tinting by the addition of pigments to match tooth color is completely avoided. Thus, the dentist is relieved of the burden of matching pigmented powders to tooth colors as is now required. With these new mimetic filling materials, the same composition matches almost every shade and color of tooth enamel. Like a chameleon, the filling takes on the color of its surroundings. These novel fillings further simulate tooth-enamel in general properties, for example, the surface finish or roughness.

The optical characteristics of these mimetic filling materials may be achieved without sacrifice of proper strength in tension and compression, suitable overall hardness to indentation, toughness and resistance to deterioration by moisture, while providing filling materials having coefficients of thermal expansion not too remote from those of teeth, which do not discolor or display excessive volume change on setting or polymerizing and which tenaciously adhere to the tooth or to a suitable primer coating or tooth liner so that moisture penetration is substantially nil.

The optically refractive and diffractive in situ hardenable dental filling composition of this invention is essentially devoid of colored pigments, consisting essentially of essentially independently transparent and colorless phases having refractive indices after hardening adapted in combination to provide translucency, one phase being liquid, continuous and adherent to tooth substance before and after hardening, and in combination with solid discontinuous phases, serving after hardening to pass light incident at substantially any angle from an outer surface to an included tooth surface and pass light reflected from said tooth surface, without spectral distortion and without focusing in the mass, outwardly to said outer surface, whereby said filling mimetically possesses the coloring of said tooth surface and simulates normal tooth enamel of matching color.

Dental filling or restorative compositions (the terms are used interchangeably herein) having mimetic properties can be made by blending a liquid substantially colorless hardenable binder, a solid colorless and transparent spherular filler, and solid substantially colorless and transparent interstitial filler. The liquid binder and fillers should have refractive indices which are different by at least some small degree, e.g. about 0.005, but which are not so different that the blend of binder and filler appear opaque at a thickness of the order of about 1.5 mm. When blended the dental filling compositions of the invention form a translucent solid upon hardening. While essentially devoid of pigments, the inclusion of some small amount of pigment to tint the base-hue of the composition may be resorted to in some applications. The amount of pigment should be so small as not to significantly alter the translucency or affect the mimetic properties of the composition.

Because these mimetic compositions do not necessarily fall within the range of opacity specified as acceptable by American Dental Association test No. 9, another measuring scale was devised to measure opacity of mimetic compositions. This new scale for opacity which seems to have validity for mimetic filling materials is one that employs a cast wedge of the hardened filling material having smoothed, or at least uniformly abraded, surfaces. The zone along the wedge at which 1 mm. wide black lines spaced 1 mm. apart are first discernible is herein-after called the clarity index. A wedge having a taper of 1 part in 30 is sufficiently gradual to give a satisfactory scale. The wedge increases from zero to 3.0 mm. in thickness over the 9 cm. length. The exact width is not important but about 10 to 15 mm. is suitable. The clarity index of the hardened material of the wedge is measured from the thicker end in centimeters. When a wedge of a hardened composition has a clarity index quite close to 4.5 cm., e.g. 4.0 to 5.0, this has thus far been found to indicate a composition of the desired degree of opacity.

Mimetic dental filling compositions can be made by combining about 50 to 90 percent solid filler, and 10 to 50 percent hardenable binder, percentages being by weight based upon a total composition weight of 100 percent.

While theoretically the solid filler may be composed entirely of substantially transparent and colorless spherules in assorted sizes as a practical consideration, it is generally desirable to use a blend of spherular fillers and interstitial fillers as noted previously herein. Presently preferred interstitial fillers are short lengths of inorganic vitreous fibers. In general these will have lengths greater than and diameters less than the diameters of at least some of the spherular filler. Vitreous fibers include particularly glass fibers e.g. glass wool available as staple lengths commercially. Interstitial fillers of other types and shapes which are substantially colorless and have refractive indices in the desired ranges may also be used in place of a in combination with such fibers, for example, interstitial fillers of fibers and powdered lithium aluminum silicate are quite effective. The substantially transparent and colorless spherular filler may be selected to have a relatively low coefficient of thermal expansion thereby compensating for the relatively high coefficients exhibited by the used polymeric materials used generally as binders. The important feature, however, is the translucency or transparency inasmuch as this effectively confers the coloring of the surrounding tooth on the finished filling by transmission through the filling. The inorganic fillers are selected to have a hardness comparable to that of tooth enamel and for this purpose a hardness of from about 5 to about 7 on the Mohs' scale appears especially suitable. This encompasses the range of hardness of many vitreous materials. The term spherular filler as herein employed refers particularly to spherules having a range of diameters of from about 5 to about 100 microns and preferably less than about 400 mesh, i.e., within the range of about 5 to 30 microns. The advantages obtained by employing vitreous spherules are that the individual particles are isotropic and hence will wear evenly and in spherular form have optimum crushing strength. They are also less abrasive toward metallic spatulas employed in dental operations.

In general, the spherules which are most useful are those having refractive indices from about 1.50 to about 1.55, but vitreous spherules of other refractive indices may be employed under the conditions herein described, and as will be seen even in the preferred range identical matching of the refractive indices of the vitreous fibers, inorganic particular material and binder is to be avoided. Suitable vitreous spherules having refractive indices in this desirable range are available commercially under the tradenames:

"Superbrite" (Minnesota Mining and Manufacturing Company),
"Catathote" (Catathote Corp.),
"Flex-o-lite" (Flex-o-lite Corp.),
"Prismo" (Prismo Corp.)

The vitreous fibers and particulate materials are advantageously treated with a priming material to promote adhesion of the polymeric binder thereto. Such primers include, for example, complexes of chromium trichloride with methacrylic, thioglycolic and p-aminobenzoic acids and silanes such as γ-methacryloxy-propyl-, 3,4-epoxycyclohexylethyl-, glycidoxypropyl- and ethylenedi-aminopropyl-trimethoxysilane and tris-(2-methoxyethoxy) vinylsilane. This treatment appears to have no effect on the desired optical properties of these compositions but does assure bonding of the organic binder.

The binder may be any polymerizable bonding material which is liquid and compatible with the conditions in the oral cavity and polymerizable therein (preferably without inconvenience to the patient) to a solid polymer having a glass transition temperature above the normal range of oral temperatures.

The relationship between refractive indices of fillers and polymeric bonding material must be maintained so that there is always a difference between the refractive indices of filler and binder. This difference should be less than 0.15 and preferably less than 0.1 refractive index units between the average of each of the two phases.

A presently preferred polymerizable binding composition comprises the bisacrylate monomer prepared from interaction of glycidyl methacrylate and bispenol A or other bisphenol in the presence of a base such as dimethyl-p-toluidine and containing a small percentage of oxirane oxygen either as residuum or added thereto. For example, the resins used in the binder of Examples 1 and 2 below is prepared by heating 313 parts of glycidyl methacrylate and 228 parts of 2,2-bis (4′-hydroxyphenyl)propane, i.e. bisphenol A, with 2.7 parts of dimethyl-p-toluidine for 48 hours at 60° C. with stirring. The resulting resin contains a small amount (0.58) percent of free oxirane groups and is used directly in the following examples. The oxirane content may be further raised by the addition of small amounts of glycidyl methacrylate after cooling the reaction mixture. The presence of the slight content of oxirane oxygen appears to give especially effective adhesion to tooth substance and to the filler. Such polymerizable compositions and the resultant polymers generally have refractive indices in the range of about 1.50 and 1.55. Materials having refractive indices outside this range are also readily available, for example, by inclusion of halogen substituted materials or by use of polymers with low aromatic ring content.

Boron-containing complexes, such as the diethylamine complex of boron trifluoride and complexes of bases such as amines or sodium hydroxide with triarylboranes, e.g., triphenyl borane-ammonia may be included as pro-catalysts or latent catalysts, promoters or accelerators such as dimethyl-p-toluidine may also be included. Two part systems may then be formulated so that the fillers, monomers, catalyst promoter and pro-catalyst are stably distributed between the two parts. For example, the catalyst may be combined in the amount of fluid monomer with an amount of monomeric acid in the amount sufficient to neutralize the base of the pro-catalyst and accelerator. The other part of the system then contains further fluid monomer together with other components and all the fillers. Other combinations will be readily apparent to those skilled in the art.

EXAMPLE 1

Blends in which parts are by weight are prepared using the above bisacrylate resin from the interaction of glycidyl methacrylate and 2,2-bis(4′-hydroxyphenyl) propane having $n_D=1.55$ as the base for the polymeric binder. The binder contains 89 parts of the bisacrylate resin, 10 parts of methyl methacrylate and 1 part of triphenyl borane ammonia. Dimethyl-p-toluidine content is raised to be about 0.83 percent by further additions. Preparation of the mimetic dental filling composition is as follows:

First, thirty parts of polymeric binder are combined with 70 parts of glass beads or spherules of 18–40 micron size, $n_D=1.52$ (available commercially under the tradename "Superbrite" 380), previously treated with γ-methacryloxypropyl trimethoxysilane by evaporation of 1 part of a 1 percent solution thereof in 0.1 percent aqueous acetic acid on 3 parts of the beads.

Then 64 parts of 1/64 inch long (0.4 mm.) about 13 micron diameter glass-fiber staple ($n_D$=1.516) previously treated with primer as above are blended with 36 parts of the same polymeric binder. Thirty parts of this latter blend containing fiber are blended with seventy parts of the blend containing beads.

The mixing, combining and blending operations are carried out under conditions such that occlusion of air is minimized by milling or by slow rotation of a closed container containing the ingredients over a prolonged period. It is not necessary that the ingredients be mixed in any particular order or that two separate mixtures be prepared. It is fully equivalent to combine 49 parts of the spherules, 19.2 parts of glass fiber staple and 31.8 parts of the polymeric binder.

This composition of the invention is employed for filling teeth, after preparation of the cavity, by mixing 1.5 g. with 1 drop (about 23 mgm.) of a 5 percent solution of benzoyl peroxide in 1:3 methyl methacrylate-methacrylic acid on a glass plate with a spatula and immediately transferring to the cavity. The mixture becomes no longer workable after 3–4 minutes and is ready for polishing by conventional procedures in about 10 minutes. The filling blends fully into the surroundings in the tooth and thus mimics the tooth color.

EXAMPLE 2

Other compositions are prepared similarly by varying the proportions of fiber and spherules in the same binder. Portions of each are polymerized as described above and polished by conventional procedures with cuttlefish and tested for roughness against the tip of the tongue. The proportions and results are summarized in the following table in which parts are by weight.

| Parts glass fiber | Parts spherules | Parts resin | Roughness |
| --- | --- | --- | --- |
| 0 | 70 | 30 | Rough. |
| 6.4 | 63 | 30.6 | Do. |
| 12.8 | 56 | 31.2 | Slightly rough. |
| 19.2 | 49 | 31.8 | Smooth. |
| 21.3 | 46.7 | 32 | Do. |
| 25.6 | 42 | 32.4 | Do. |

Substantially similar results are obtained when glass fibers of various diameters and compositions are used alternatively in the above compositions.

EXAMPLE 3

A presently preferred mimetic filling composition is as follows:

Ingredient: Weight percent
Glass beads (30µ average diameter, size distribution approximately 5 to 50µ) $n_D$=1.525 _____ 48
Glass fibers (about 4 mm. length, approximate 13µ diameter) $n_D$=1.516 _____ 17
Binder (contains 0.1 percent fluorescent pigment) $n_D$=1.534 prior to hardening and 1.552 after hardening _____ 28
Lithium aluminum silicate powder (30 percent eucryptite and 70 percent spodumene) $n_D$=1.52 to 1.548 _____ 7

The glass fibers and lithium aluminum silicate powder forming the interstitial filler aid the smoothness and surface hardness of the hardened filling composition.

The binder is prepared as a two part composition, one part being as follows:

Part I

Ingredient: Percent by weight
Bisphenol A _____ 37.1
Glycidyl methacrylate _____ 50.9
N,N-dimethyl-p-toluidine _____ .9
Methyl methacrylate _____ 10.0
Triphenyl boron-ammonia _____ 1.0
Fluorescent pigment (U.S. Patent No. 2,481,344, sold as "Ottalume 2115" by the Ottawa Chemical Company) _____ .1

Part II

Ingredient:
Methyl methacrylate _____ 28.5
Methacrylic acid (glacial) _____ 66.5
Triphenyl boron ammonia _____ 1.0
Benzoyl peroxide _____ 4.0

In making up Part I, the first three named ingredients are reacted as noted hereinbefore, and the remaining materials noted are added thereto. To this resultant resin are added the solid fillers.

To convert the two part mixture to a hardenable filling composition, Part I, with which the solid fillers have been blended, is combined with Part II with a dental spatula or the like in a ratio of about 1 drop of Part II to 1½ grams of Part I including fillers. The mixing may be completed in a few seconds as the parts are readily miscible and polymerization begins almost immediately. The resulting mass of hardenable filling composition is a translucent mass which has a grayish neutral hue. Because it hardens within a period of less than about 10 minutes, it is applied to the cavity immediately upon mixing and before gelation, e.g. within about two minutes after blending.

Prior to application of the composition, the cavity should be treated with a suitable, preferably transparent liner, to prevent possible reactions of pulp with the binder. A suitable liner used in the preparation of many anterior teeth filled with this composition, is a 10 percent solution of vinylidene chloride-acrylonitrile copolymer in acetone.

After filling, and hardening, the surface of the hardened filling may be finished by conventional finishing operations. The resulting fillings mimic surrounding tooth enamel to such an extent that in most instances the filling is visually undetectable.

This composition has a clarity index of about 4.5 cm. As noted hereinbefore this is well within the range noted as desirable for anterior fillings. For posterior fillings where superior mimetic properties are not demanded, clarity index in the range of 1 to 8 may still provide a mimetic filling superior to the opaque fillings of the prior art.

Superior compositions are those wherein glass spherules, $n_D$=1.50–1.55, and from 5 to 50 microns in diameter constitute about 40 to 60 percent of the weight of the composition and the smaller, randomly shaped solid interstitial fillers such as the mixture of glass fibers and lithium aluminum silicate powder make up about 10 to 30 percent. The binder should be present in at least about 15 percent by weight of the composition to enable the composition to be worked and no more than about 40 percent as the composition may then be too fluid.

The embodiments of the invention in which an exclusive property or privilege is claimed are defined as follows:

1. A dental restorative composition which upon hardening assumes the coloration of the tooth structure to which it is applied, said composition consisting essentially of a blend of liquid polymerizable organic binder and solid inorganic filler, said inorganic filler comprising solid vitreous spherular particles having a hardness of from about 5 to 7 on the Moh's scale and diameters averaging in the range of from about 5 to 30 microns, said binder and said filler being essentially transparent with said filler having a refractive index different from that of said binder upon hardening of said binder, such refractive index difference being from about 0.005 to about 0.15 of a refractive index unit, said composition containing from 10 to 50 percent by weight hardenable binder and 50 to 90 percent by weight solid filler.

2. A mimetic direct-filling dental resin composition in which hardening is initiated before application to a tooth structure and which is storable for periods of weeks therebefore, comprising a combination, totalling 100 percent, 10 to 50 percent by weight of liquid substantially colorless hardenable binder and 50 to 90 percent by weight of a blend of from about 10 to 50 percent by weight of vitreous fibrous filler and from about 35 to 75 percent by weight of substantially transparent and colorless inorganic spherular filler in a size range on the order of 5 to 100 microns, said composition hardening within from about 2 to about 10 minutes of the initiation of hardening to a solid translucent filling in which the hardened liquid binder has a refractive index of from 0.005 to 0.15 less than the refractive indices of solid particles whereby said dental resin picks up and mimics the color of the tooth enamel adjacent thereto.

3. A dental restorative composition which upon hardening assumes the coloration of the tooth structure to which it is applied, said composition consisting essentially of a blend of liquid polymerizable organic binder and solid inorganic filler, said inorganic filler comprising solid vitreous spherules having a hardness of from about 5 to 7 on the Moh's scale and diameters averaging in the range of from about 5 to 30 microns, said binder and said filler individually being essentially transparent with said filler having a refractive index different from said binder by from about 0.005 to about 0.15 of a refractive index unit, said composition containing from 10 to 50 percent by weight hardenable binder and 50 to 90 percent by weight solid filler, said binder composition consisting essentially of an acrylate monomer prepared from interaction of glycidyl methacrylate and bisphenol A and containing a small percentage of oxirane oxygen and upon hardening to a solid product having a refractive index in the range of 1.50 to 1.55.

4. A direct filling dental resin composition which is hardenable in place in the tooth in no more than 10 minutes and which in its hardened state mimics the color of the surrounding tooth, said resin composition being essentially devoid of pigmentation and consisting essentially of a blend of a colorless liquid polymerizable resin binder which when hardened has a refractive index of about 1.50 to about 1.55, and a solid filler, said filler comprising about 40 to 60 percent by weight of said blend and consisting essentially of a combination of spherular glass beads in a size range of from about 5 to 30 microns and non-spherular particles, said beads constituting about 35 percent to 75 percent by weight of said filler, said filler having a refractive index different from and somewhat greater than that of said binder in its hardened state, such difference being no more than 0.15 refractive index unit.

5. The dental resin of claim 4 wherein said non-spherular filler particles are short, glass fibers.

6. A method for the restoration of the normal contours and appearance of a tooth having a discontinuity in the enamel thereof which comprises restoring the normal contours interrupted by such discontinuity by applying a hardenable composition immediately after hardening has commenced therein and shaping said composition to the normal contours of said tooth while said composition remains in a workable consistency, said hardenable composition upon hardening assuming the coloration of the adjacent tooth enamel and consisting essentially of a blend of liquid polymerizable organic binder and solid inorganic filler, said inorganic filler comprising solid vitreous spherular particles having a hardness of from about 5 to 7 on Mohs' scale and diameters averaging in the range of from about 5 to 30 microns, said binder and said filler being essentially transparent with said filler having a refractive index different from that of said binder upon hardening of said binder, such refractive index difference being from about 0.005 to about 0.15 of a refractive index unit, said composition containing from 10 to 50 percent by weight hardenable binder and 50 to 90 percent by weight solid filler.

7. The method according to claim 6 wherein hardening is initiated by the addition of a hardening agent to the hardenable composition.

References Cited

UNITED STATES PATENTS

| 2,793,436 | 5/1957 | Gotlib | 260—41 |
| 3,066,112 | 11/1962 | Bowen | 260—41 |
| 3,107,427 | 10/1963 | Schmitt et al. | 260—40 |
| 3,164,563 | 1/1965 | Maxwell et al. | |
| 3,227,665 | 1/1966 | Fourcade et al. | 260—40 |
| 3,250,002 | 5/1966 | Collito | 32—15 |

OTHER REFERENCES

Handbook of Reinforced Plastics, Reinhold Publishing Corp., 1964, p. 147.

MORRIS LIEBMAN, *Primary Examiner.*

L. T. JACOBS, *Assistant Examiner.*

U.S. Cl. X.R.

260—37, 41, 836